United States Patent
Luo

(10) Patent No.: US 7,596,629 B2
(45) Date of Patent: Sep. 29, 2009

(54) SYSTEM AND METHOD FOR INTERCONNECTING HETEROGENEOUS LAYER 2 VPN APPLICATIONS

(75) Inventor: Wei Luo, San Diego, CA (US)

(73) Assignee: Cisco Technology, Inc., San Jose, CA (US)

( * ) Notice: Subject to any disclaimer, the term of this patent is extended or adjusted under 35 U.S.C. 154(b) by 810 days.

(21) Appl. No.: 10/430,637

(22) Filed: May 6, 2003

(65) Prior Publication Data

US 2005/0044262 A1 Feb. 24, 2005

Related U.S. Application Data

(60) Provisional application No. 60/428,198, filed on Nov. 21, 2002.

(51) Int. Cl.
*G06F 15/173* (2006.01)
*H04L 12/28* (2006.01)
*H04L 12/56* (2006.01)

(52) U.S. Cl. ............ 709/238; 709/223; 370/395.5

(58) Field of Classification Search ......... 709/223, 709/238; 370/395.5
See application file for complete search history.

(56) References Cited

U.S. PATENT DOCUMENTS

| | | | | |
|---|---|---|---|---|
| 6,339,595 | B1 * | 1/2002 | Rekhter et al. | 370/392 |
| 6,778,498 | B2 * | 8/2004 | McDysan | 370/231 |
| 7,072,346 | B2 * | 7/2006 | Hama | 370/395.53 |
| 7,082,101 | B2 * | 7/2006 | Kim et al. | 370/225 |
| 7,111,072 | B1 * | 9/2006 | Matthews et al. | 709/238 |

FOREIGN PATENT DOCUMENTS

EP    1 168 728 A    1/2002

OTHER PUBLICATIONS

Lau, et al. "Layer Two Tunneling Protocol (Version 3)," IETF Internet Draft, Jan. 2003, 75 pages.
Townsley, "Pseudowires and L2TPv3," IETF Internet Draft, Jun. 2002, 18 pages.
Townsley, et al., "Layer Two Tunneling Protocol L2TP," IETF Request for Comments 2661, Aug. 1999, 75 pages.
Rosen, et al., "LDP-Based Signaling for L2VPNs," IETF Internet Draft, Sep. 2002, 23 pages.
Martini, et al., "Transport of Layer 2 Frames Over MPLS," IETF Internet Draft, Nov. 2002, 21 pages.
Andersson "L2VPN Framework," IETF Internet Draft, Jan. 2003, 41 pages.
Bates, et al., "Multiprotocol Extensions for BGP-4," IETF Request for Comments (RFC) 2858, Jun. 2002, 11 pages.
Luo, Wei, "L2vpn Signaling Using L2TPv3," Internet Draft, Feb. 2003, 16 pages.

* cited by examiner

*Primary Examiner*—Ario Etienne
*Assistant Examiner*—Avi Gold
(74) *Attorney, Agent, or Firm*—Cindy Kaplan

(57) ABSTRACT

Systems and methods for interconnecting heterogeneous layer 2 virtual private network applications. To facilitate such interconnections, a common addressing scheme for forwarders is provided. All current pseudowire signaling protocols can incorporate this addressing scheme, and therefore establish connectivity among forwarders of different applications. Auto-discovery of remote forwarders is also facilitated by use of a common address family identifier (and subsequent address family identifier) for BGP.

25 Claims, 6 Drawing Sheets

SYSTEM AND METHOD FOR INTERCONNECTING HETEROGENEOUS LAYER 2 VPN APPLICATIONS

STATEMENT OF RELATED APPLICATIONS

The present invention claims priority from U.S. Provisional App. No. 60/428,198, filed on Nov. 21, 2002, entitled "Method to Interconnect Heterogeneous Layer 2 VPN Applications," the contents of which are herein incorporated by reference in their entirety for all purposes.

BACKGROUND OF THE INVENTION

The present invention relates to data networking and more particularly to virtual private networks.

Virtual private network technology is a popular and effective way of interconnecting geographically dispersed nodes belonging to a private network operator such as an enterprise via a service provider network that is shared with other data services such as other virtual private networks or public data services. The enterprise achieves the connectivity of a private network without having to own and operate its own network infrastructure over a wide geographic region.

A particular type of network is known as a layer 2 virtual private network (L2VPN). Layer 2 frames such as, e.g., Ethernet frames, PPP frames, etc., are carried across the service provider network via tunnels. The service provider network may be, e.g., a packet switched network that uses IP or MPLS or a combination of both, and the tunnels can be IP or MPLS tunnels. The layer 2 virtual private network can allow remote nodes to connect to one another as if they were connected to a shared physical medium even though their connection is in fact across the service provider network cloud. For example, a virtual private LAN may be configured across the service provider network.

Consider the structure of a layer 2 virtual private network. The layer 2 virtual private network interconnects remote customer networks via the service provider network. The service provider network is a packet-switched network. On the provider side of the border between the provider network and the customer network there are one or more provider edge routers. On the customer side of the border there are one or more customer edge routers.

An "attachment circuit" is a single 2-way physical or virtual link between a provider edge router and a customer edge router. For example, an attachment circuit may be, e.g., an RS-232 serial line, a point-to-point Ethernet connection, an ATM virtual circuit, etc.

A "pseudowire" is an emulated 2-way circuit across the provider network. A pseudowire may be implemented as a pair of VC LSPs (Virtual Circuit Label Switched Paths), one in each direction in an MPLS network. Multiple pseudowires may share the same tunnel LSP.

One application that may be provided across such a network is a simple cross-connection between attachment circuits via a pseudowire. This is sometimes referred to as a virtual private wire service (VPWS). Traffic received from an attachment circuit on a provider edge router is forward to a remote provider edge router via the pseudowire. When the remote provider edge router receives traffic from the pseudowire, it selects the correct receiving attachment circuit based on an encapsulation demultiplexing identifier (e.g., an MPLS label) assigned to traffic for that pseudowire.

In a variant of the just-described VPWS implementation, multiple attachment circuits are aggregated into what is referred to as a "colored pool". For example, a colored pool might contain all of the attachment circuits between a given provider edge router and a given customer edge router. A pseudowire may connect two colored pools on remote provider edge routers by connecting two arbitrary attachment circuits belonging to the two pools.

Another application that may be provided is a virtual private LAN service (VPLS). To implement a VPLS, each participating provider edge router is fitted with a virtual switching instance (VSI). A VSI operates as a type of virtual LAN switch between one or more attachment circuits and one or more pseudowires. When a frame arrives at a VSI via an attachment circuit or pseudowire, a layer 2 address of the frame is used to pick an output attachment circuit or pseudowire. A virtual private LAN can be constructed as a mesh of pseudowires between VSIs on participating provider edge routers.

Generically, a single VSI used to implement VPLS, or a colored pool or single attachment circuit used to implement VPWS, may be referred to as a "forwarding instance" or "forwarder." Currently, a forwarder (colored pool or single attachment circuit) associated with a VPWS can only connect to another forwarder associated with a VPWS and a forwarder (VSI) associated with a VPLS can only connect with another forwarder (VSI) associated with a VPLS. It would be desirable to provide connections between heterogeneous layer 2 VPN applications, e.g., between a VPLS forwarder and a VPWS forwarder.

A difficulty arises in signaling the connection of such disparate forwarders via a pseudowire. On approach to signaling interconnections between forwarders is described in Martini, et al., "Transport of Layer 2 Frames Over MPLS," IETF Internet Draft, November 2002, the contents of which are herein incorporated by reference for all purposes in their entirety. A virtual circuit identifier is used to identify a pseudowire. When forwarders wish to connect, they must be preconfigured with the same virtual circuit identifier so that they can refer to it when signaling the connection. Auto-discovery of remote forwarders does not avoid the need for a priori knowledge of the virtual circuit identifiers. Also, every time a remote forwarder must be shifted to a different provider edge router due to system maintenance needs, both the remote forwarder and a local forwarder have to be reconfigured.

Another method of signaling interconnections between forwarders is described in Rosen, et al., "LDP-Based Signaling for L2VPNs," IETF Internet Draft, September 2002, the contents of which are herein incorporated by reference for all purposes in their entirety. Each forwarder is assigned an "attachment identifier" that is unique on a particular provider edge router. The combination of the provider edge router's address and the attachment identifier provides a globally unique identifier for the forwarder. However, the signaling procedures do not use the globally unique form of the identifier but instead use various components of the globally unique identifier and the components that are used change depending on which application is being supported and, for VPWS, whether the connection is to be between colored pools. It is therefore difficult to interconnect forwarders corresponding to disparate layer 2 virtual private network applications because the signaling mechanism lacks a generalized application-independent method for uniquely specifying a forwarder. A further obstacle to interconnection is that different VPN applications are assigned different multiprotocol BGP subsequent address family identifiers, making auto-discovery of disparate types of forwarders impossible.

Systems and methods for interconnecting forwarders belonging to heterogeneous layer 2 virtual private network applications are needed.

SUMMARY OF THE INVENTION

Embodiments of the present invention provide systems and methods for interconnecting heterogeneous layer 2 virtual private network applications. To facilitate such interconnections, a common addressing scheme for forwarders is provided. All current pseudowire signaling protocols can incorporate this addressing scheme, and therefore establish connectivity among forwarders of different applications. Auto-discovery of remote forwarders is also facilitated by use of a common address family identifier (and subsequent address family identifier) for BGP.

One aspect of the present invention provides a method for operating a first provider edge node in a virtual private network. The method includes: providing a source forwarder in the first provider edge node wherein a target forwarder is provided at a second provider edge node of the virtual private network, sending a request from the first provider edge node to the second provider edge node for connection of the source forwarder to the target forwarder via a pseudowire, and including in the request an identifier of the target forwarder. The identifier includes a portion belonging to an address space shared by forwarders that are connected to multiple attachment circuits to customer nodes and forwarders that are connected to a customer node via exactly one attachment circuit. The identifier is globally unique within the virtual private network.

Further understanding of the nature and advantages of the inventions herein may be realized by reference to the remaining portions of the specification and the attached drawings.

DESCRIPTION OF SPECIFIC EMBODIMENTS

Embodiments of the present invention find application in layer 2 virtual private networks. Layer 2 virtual private networks carry layer 2 frames within tunnels across a packet-switched network. Background information about layer 2 virtual private networking is found above and in the following documents, the contents of which are herein incorporated by reference in their entirety for all purposes:

Lau, et al. "Layer Two Tunneling Protocol (Version 3)," IETF Internet Draft, January 2003. (hereinafter "Lau, et al.")

Townsley, "Pseudowires and L2TPv3," IETF Internet Draft, June 2002.

Townsley, et al., "Layer Two Tunneling Protocol "L2TP," IETF Request for Comments 2661, August 1999.

Rosen, "LDP-based signaling for L2VPNs," IETF Internet Draft, September 2002.

Martini, et al. "Transport of Layer 2 Frames Over MPLS," IETF Internet Draft, November 2002.

Andersson "L2VPN Framework," IETF Internet Draft, January 2003.

Figure 1:
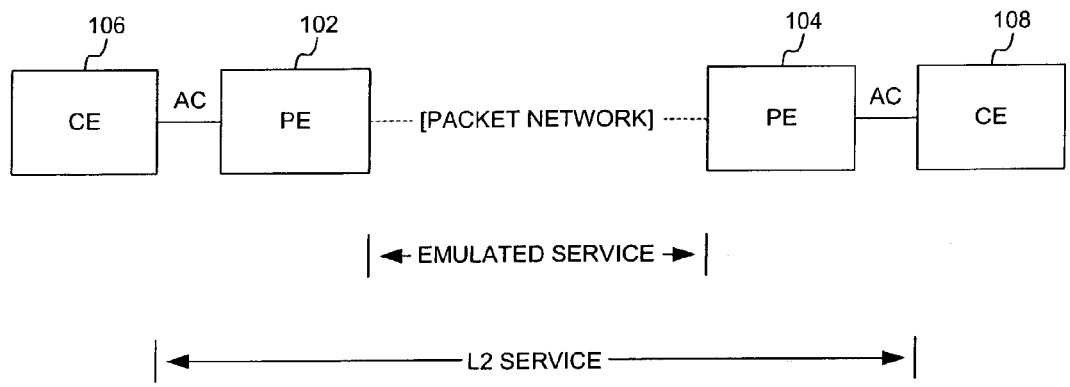
FIG. 1 depicts a network reference model for a layer 2 virtual private network.

FIG. 1 depicts a layer 2 virtual private network reference model. Two provider edge routers 102 and 104 are interconnected by packet-switched network. Provider edge router 102 is connected to a customer edge router 106 via an attachment circuit. Provider edge router 104 is connected to customer edge router 108 via another attachment circuit. A pseudowire extends between provider edge router 102 and provider edge router 104 across the packet-switched provider network.

In a simple cross-connect application, an attachment circuit is directly bound to the pseudowire. This is a one-to-one mapping. Layer 2 connectivity is provided between customer edge routers 106 and 108.

Figure 2:
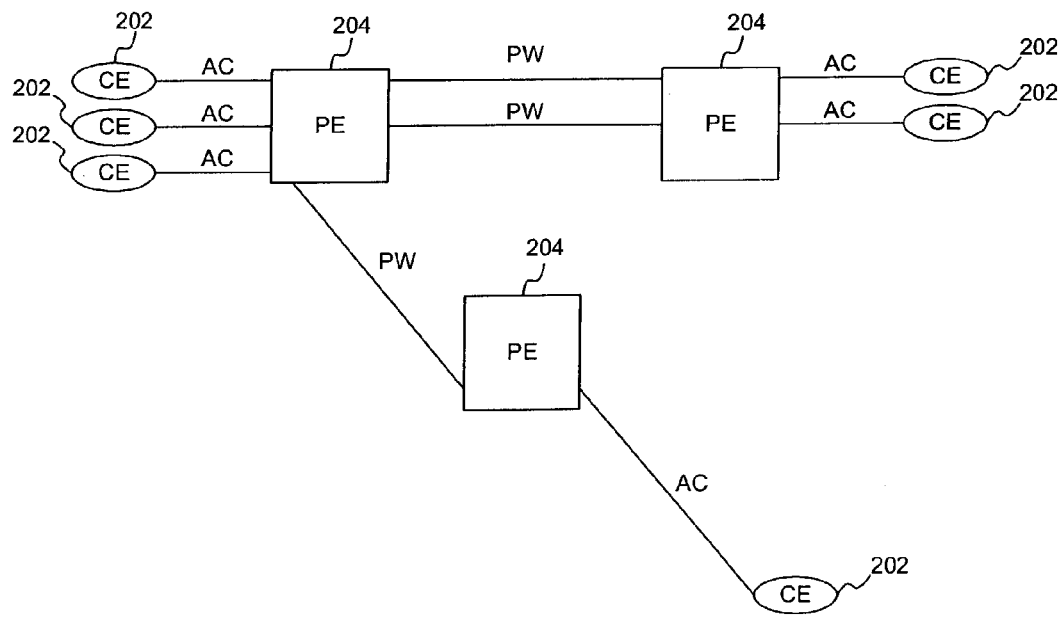
FIG. 2 depicts a layer 2 virtual private network using virtual private wire service (VPWS).

FIG. 2 depicts a VPWS scenario where interconnectivity among customer edge routers 202 through a packet-switched network is provided by provider edge routers 204. Each customer edge router 202 is connected to its local provider edge router 204 via an attachment circuit. Each attachment circuit is bound to a particular pseudowire that itself connects to a remote provider edge router. When traffic is received at a provider edge router via an attachment circuit, it is automatically forwarded to the corresponding pseduowire. Similarly, when traffic is received via a pseudowire, it is automatically transferred to the bound attachment circuit.

One can also aggregate sets of attachment circuit into colored pools. For example, a single colored pool may include all the attachment circuits between a given customer edge router and a given provider edge router. A cross-connect pseudowire that connects to a colored pool will actually connect to an arbitrary one of the attachment circuits belonging to the colored pool.

Figure 3:
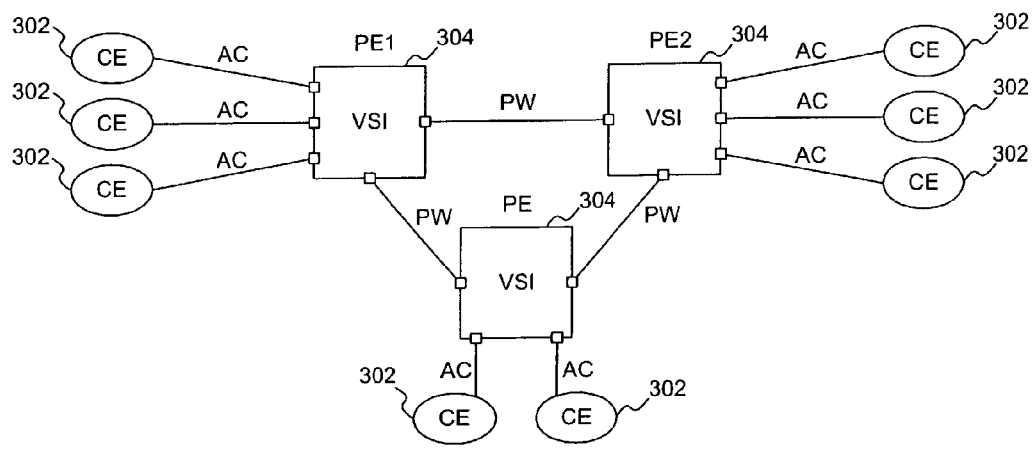
FIG. 3 depicts a layer 2 virtual private network using virtual private LAN service (VPLS).

FIG. 3 depicts a simple VPLS scenario. A virtual private LAN has been established to interconnect customer edge routers 302. Each of provider edge routers 304 is fitted with a single VSI. Of course in a real application, provider edge routers may be fitted with multiple VSIs. Multiple attachment circuits and pseudowires are connected to each VSI. The VSI acts as a virtual LAN switch. The VSI forwards frames based on their layer 2 identifiers.

In both the VPLS and VPWS scenarios, it is convenient to refer to an element to which the pseduowire connects as a "forwarder." In the VPLS scenario, the forwarder is a VSI. In the VPWS, the forwarder is an attachment circuit, except that it may be a colored pool to which the attachment circuit belongs.

Figure 4:
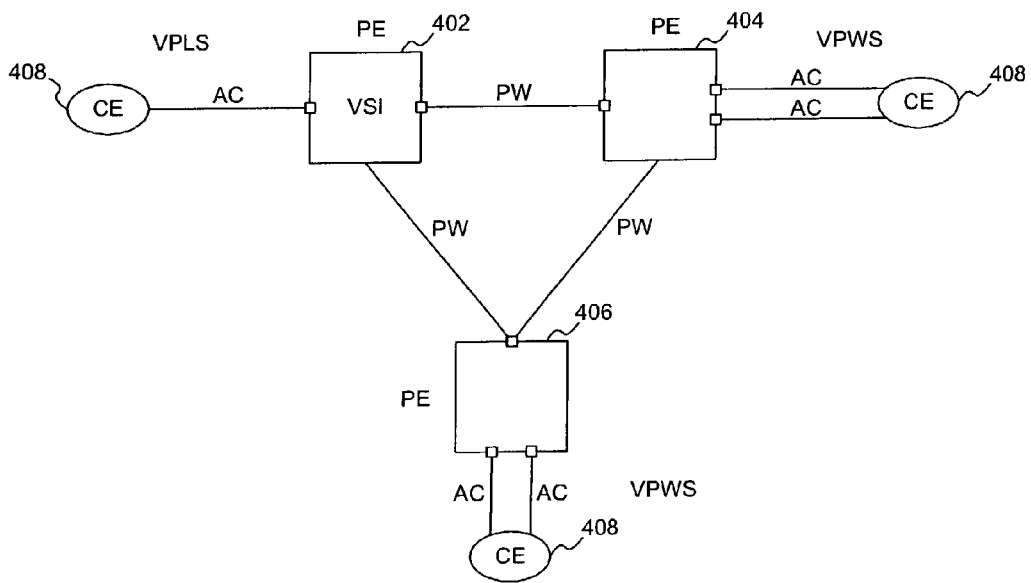
FIG. 4 depicts a layer 2 virtual private network employing both VPWS and VPLS according to one embodiment of the present invention.

FIG. 4 depicts a heterogeneous layer 2 virtual private networking scenario among customer edge routers 408 according to one embodiment of the present invention. In FIG. 4, provider edge router 402 has a VSI and thus implements a VPLS application for its customer edge routers. By contrast, provider edge routers 404 and 406 provide one-to-one couplings between pseudowires and attachment circuits and thus provide a VPWS for their customer edge routers.

Embodiments of the present invention allow one to establish a virtual private network as in FIG. 4 where pseudowires interconnect disparate types of forwarder. It will of course be appreciated that the networking scenario of FIG. 4 is greatly simplified compared to many networks that may be achieved.

For example, there may be numerous VSIs and VPWS attachment circuits at a single provider edge router and disparate applications may both be present at the same provider edge router. The overall effect is to provide a heterogeneous set of layer 2 virtual private network layer applications among a set of customer edge routers 408.

Figure 5:
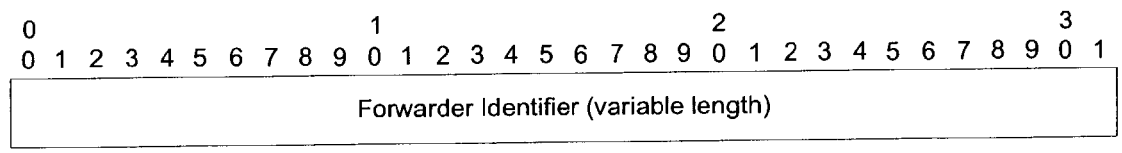
FIG. 5 depicts structure of an identifier of a forwarder operating on a provider edge router according to one embodiment of the present invention.

To support the signaling of interconnections, each forwarder is assigned a Forwarder Identifier that is unique at a given provider edge router. FIG. 5 depicts the structure of this Forwarder Identifier according to one embodiment of the present invention. The Forwarder Identifier is a variable length value.

Furthermore, each provider edge router has an associated Router ID which is a 32-bit value that is preferably globally unique within a layer 2 virtual private network. If the 32-bit Router ID value is not globally unique, it may be combined with a 64-bit Router Distinguisher as described in Rosen, et al., "BGP/MPLS VPNs," IETF Request for Comments 2547, March 1999, the contents of which are herein incorporated by reference for all purposes in their entirety. A common layer 2 virtual private network address is defined as a concatenation of the Router ID (or globally unique extension thereof) and Forwarder Identifier. This is a globally unique address that identifies the forwarder.

Before discussing the signaling of pseudowires between disparate forwarders, we will introduce auto-discovery of remote forwarders and establishment of control connections between provider edge routers. The common layer 2 virtual private network address facilitates auto-discovery. For example, BGP may be used for auto-discovery of remote forwarders. For example, the techniques used in Bates, et al., "Multiprotocol Extensions for BGP-4," IETF Request for Comments (RFC) 2858, June 2002, may be used. The contents of RFC 2858 are herein incorporated by reference in their entirety for all purposes. The Network Layer Reachability Information (NLRI) for RFC 2858 is encoded as one or more tuples of the form [Length, Prefix]:

Length: one octet that indicates the length in bits of the common layer 2 virtual private network address.

Prefix: a variable length layer 2 virtual private network address.

A common Address Family Identifier (AFI) and a common Subsequent Address Family Identifier (SAFI) are defined for all forwarder types used in layer 2 virtual private networking. In this way, Multiprotocol BGP advertisements can be used to learn about forwarders of all types on remote provider edge nodes and their properties such as, e.g., next-hop address, forwarder type, etc.

BGP is not the only method for discovering information about remote forwarders. Directory-based discovery mechanisms, such as RADIUS, may also be used. It is also possible to manually configure information about remote forwarders.

Pseudowires between provider edge routers are established within tunnels. An individual tunnel between two provider edge routers can carry multiple pseudowires. Also, between two provider edge routers there will be a control channel. The control channel is used for signaling of pseudowires. Embodiments of the present invention operate in the context of pseudowire signaling protocols such as e.g., Layer 2 Tunneling Protocol or Label Distribution Protocol. Pseudowire signaling and operation of the control channel in the context of the Layer 2 Tunneling Protocol is described in detail in Lau, et al. Pseudowire signaling and operation of the control channel in an LDP context is described in Andersson, et al., "LDP Specificiation," IETF Request for Comments 3036, January 2001, the contents of which are herein incorporated by reference for all purposes.

An overview of layer 2 virtual private network signaling procedures will now be presented. The procedures apply generally to situations where forwarders of the same type are being connected and to situations where forwarders of different types are being connected. The procedures are generic to the various pseudowire signaling schemes provided by, e.g., Layer 2 Tunneling Protocol, LDP, etc.

Assume a provider edge router knows that it wants to set up a pseudowire between a local forwarder having an assigned Forwarder Identifier and a remote forwarder on a remote provider edge router that has a certain Forwarder Identifier. Before establishing the intended pseudowire, the pair of provider edge routers exchanges control connection messages to establish a control connection. Each may advertise in these control connection messages its supported pseudowire types (e.g., Ethernet, ATM, Frame Relay, etc.) in a pseudowire capabilities list. Each may examine whether the remote provider edge router supports the pseudowire type it intends to set up.

After the control connection is established, either of the two provider edge router may send a control message to one another to initiate a pseudowire. The control message includes a local and remote forwarder identifier specifying the two forwarders which intend to be interconnected.

When the local provider edge router receives this control message, it determines whether it has a local forwarder assigned with an ID value specified by this remote forwarder identifier. The local provider edge router also examines whether the remote forwarder is allowed to connect with this specified local forwarder. If both conditions are met, the local provider edge router accepts the connection request. If either of the two conditions fails, it rejects the connection request.

Now a procedure will be defined for establishing a layer 2 virtual private network among forwarders on multiple provider edge routers. Again, the forwarders may either be of the same type or of different types.

Each provider edge router forms a list of source forwarders consisting of all local forwarders to be used by the virtual private network that is being established. The provider edge router then establishes a list of target forwarders which includes all of the local forwarders for the given virtual private network and all of the remote forwarders on other provider edge routers of the same virtual private network. Formation of the network topology depends on the contents of these lists of source forwarders and target forwarders. The two lists can be constructed by manual configuration and/or by auto-discovery.

Figure 6A:
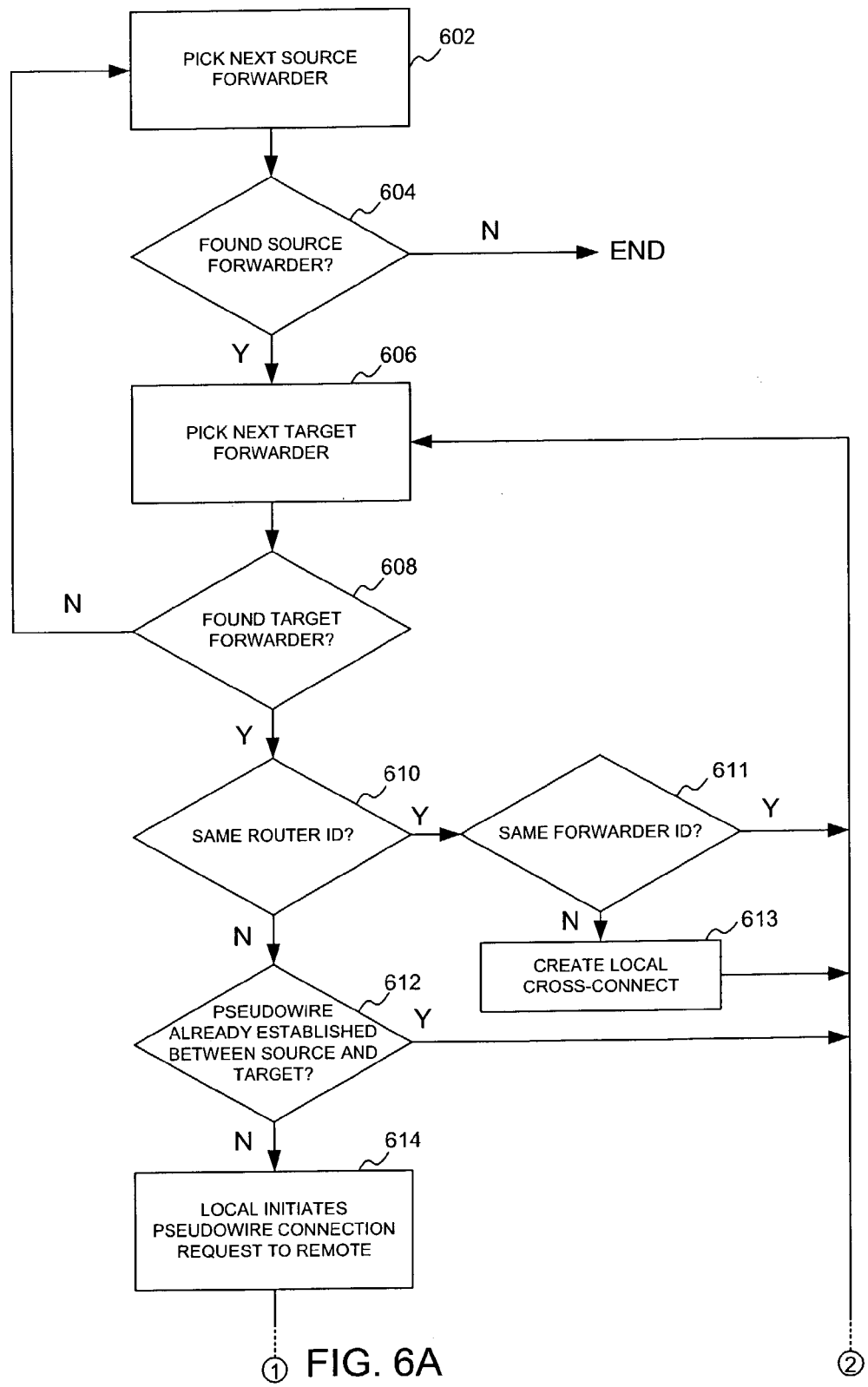
FIG. 6 is a flowchart describing steps of establishing pseudowires between two provider edge routers according to one embodiment of the present invention.
Figure 6B:
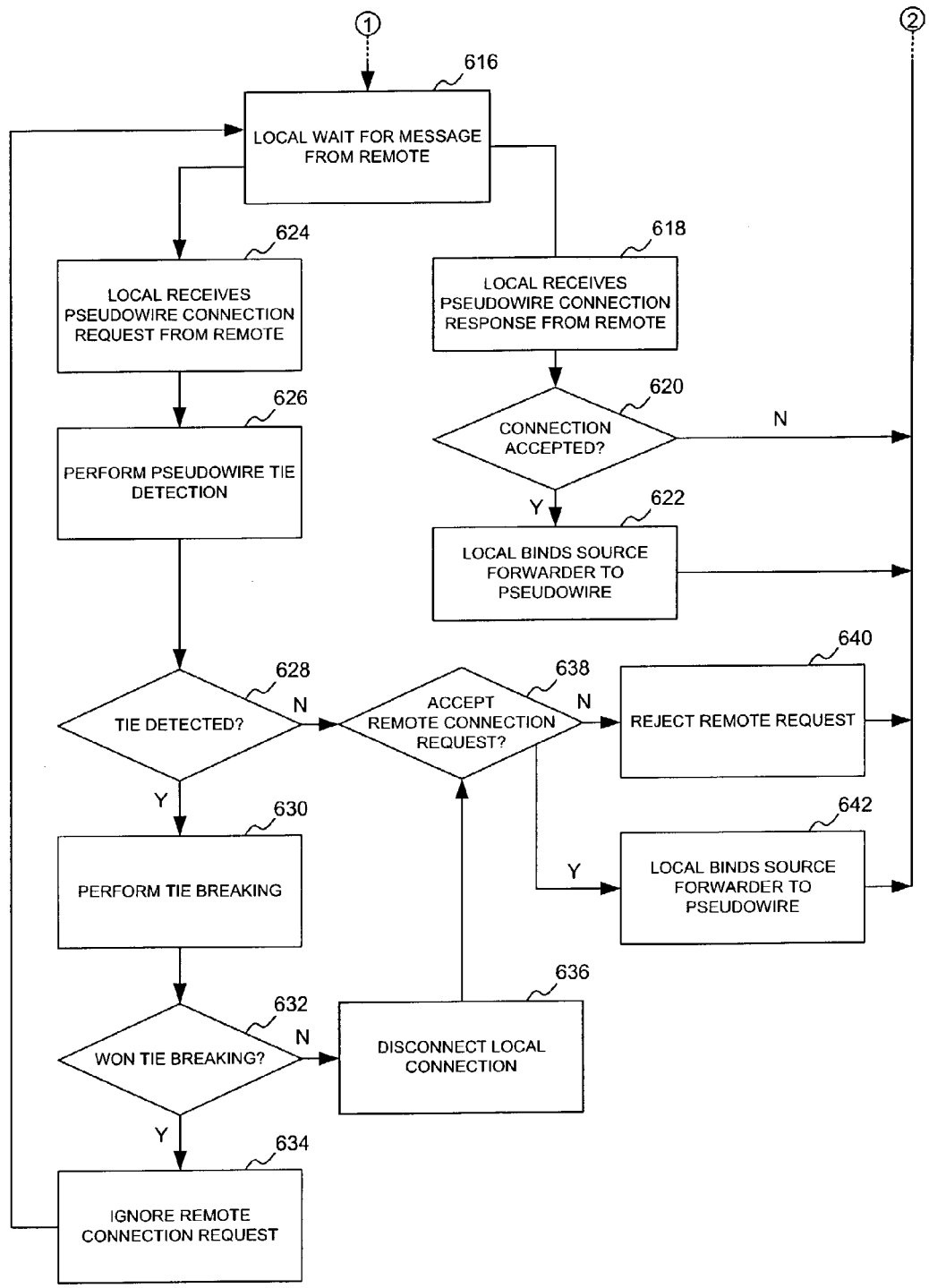

FIGS. 6A-6B are flow charts describing steps to be performed at a single provider edge router in establishing a layer 2 virtual private network according to one embodiment of the present invention. This procedure of FIGS. 6A-6B is repeated on every provider edge router involved in the layer 2 virtual private network. The procedure of FIGS. 6A-6B begin with the lists of source forwarders and target forwarders having already been defined. Each forwarder is specified as a combination of Router ID and Forwarder Identifier.

At step 602, the provider edge router picks the next forwarder from the list of source forwarders. Step 604 tests whether there are in fact any source forwarders to pick from. If no forwarder is available, processing is complete. Step 606 picks the next target forwarder from the list of target forwarders. Step 608 tests whether there are any target forwarders to pick from. If no target forwarders remain, then processing proceeds back to step 602 to pick the next source forwarder.

Step 610 compares the Router IDs of the selected source forwarder and target forwarder. If the Router IDs are different, then processing proceeds to step 612 since a pseudowire should be established between the two forwarders. Step 612 tests whether a pseudowire has already been established between the source forwarder and target forwarder. If a pseudowire has already been established, then processing proceeds back to step 606 to pick the next target forwarder.

If a pseudowire has not already been established between the source and target processing proceeds to step 614. At step 614, the local provider edge router obtains the address of the remote provider edge router, e.g., from previous manual configuration, BGP, directory look-up, etc., and establishes a control connection to the remote provider edge router if one does not already exist. Step 614 then sends a connection request to the remote provider edge router hosting the target forwarder. The Forwarder Identifiers of the source and target forwarders are encoded as the Local Forwarder Identifier and Remote Forwarder Identifier respectively in the connection request message.

Referring again to step 610, if the Router IDs of the source forwarder and target forwarder are the same, processing proceeds to a step 611. Step 611 tests whether the Forwarder Identifiers are also the same. If the Forwarder Identifiers are the same, the source forwarder and target forwarder are the same forwarder and processing returns to step 606 to pick the next target forwarder. If the Forwarder Identifiers are not the same, the source forwarder and target forwarder are not the same forwarder but are on the same provider edge router. Instead of a pseudowire, a local cross-connect is established between the source forwarder and target forwarder at step 613.

Following step 614, at step 616 the local provider edge router awaits a response from the remote provider edge router. The local provider edge router could receive either a response to its connection request or a separate connection request from the remote provider edge router. Step 618 represents receipt of a response from the remote provider edge router. Step 620 tests whether the request has been accepted or rejected. If the connection has been rejected, processing proceeds back to step 606 to pick the next target forwarder. If the connection is accepted, then at step 622 the local provider edge router binds the source forwarder to the pseudowire. Step 622 also completes the remaining signaling, if any, to the remote provider edge router and returns processing to step 606 to select the next target forwarder.

Step 624 corresponds to the case where the local provider edge router receives another pseudowire connection request from the remote provider edge router while awaiting a response to its own request. In this case, a step 626 performs pseudowire tie detection. Pseudowire tie detection is performed to avoid setting up duplicated pseudowires between two forwarders. If the received connection request and the transmitted connection request both specify the same pair of forwarders then a tie is detected. Step 628 tests whether or not a tie has been detected in step 626.

If a tie has been detected, then tie breaking is performed at step 630 to determine which of the requested connections should proceed. The tie-breaking procedure is specified by the operative pseudowire signaling protocol and does not form a part of the present invention. A step 632 tests whether the local provider edge router or remote provider edge router won the tie breaking procedure. If the local provider edge router won the tie then at step 634 it ignores the remote connection request and proceeds back to step 616. If the remote provider edge router won the tie, then processing proceeds to step 636 where the local provider edge router sends a disconnect message to the remote provider edge router to withdraw its previous connection request. Processing then proceeds to step 638 to test whether the received remote connection request should be accepted.

The remote connection request should be accepted only if there is a local forwarder having the Forwarder Identifier value specified in the remote request and the remote forwarder is allowed to connect with a specified local forwarder. If either of these conditions are not met, then at step 640, the remote request is rejected by sending a disconnect message to the provider edge router. If both conditions are met, the local provider edge router binds the source forwarder to a pseudowire to the target forwarder at step 642. After either step 640 or step 642, processing proceeds back to step 606.

Network Device Details

Figure 7:
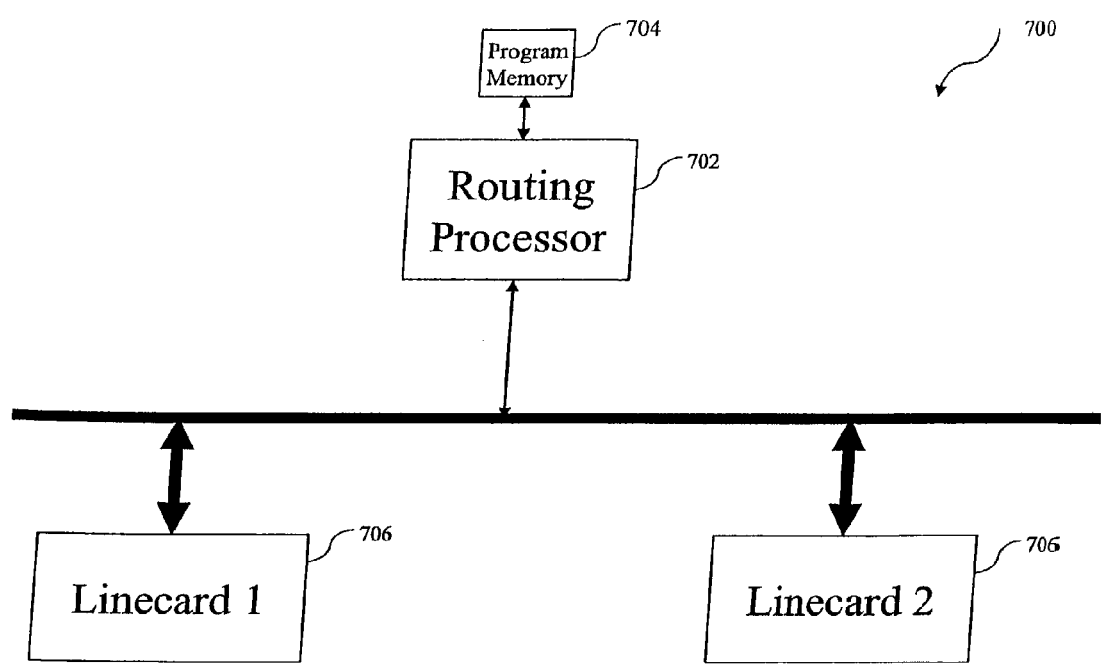
FIG. 7 depicts a network device useful in implementing embodiments of the present invention.

FIG. 7 depicts a network device 700 that may be used to implement, e.g., the provider edge routers of FIG. 4 and/or perform any of the steps of FIGS. 6A-6B. In one embodiment, network device 700 is a programmable machine that may be implemented in hardware, software or any combination thereof. A processor 702 executes code stored in a program memory 704. Processor 702 may perform the encapsulation, de-encapsulation, and flow control operations referred to above. Program memory 704 is one example of a computer-readable storage medium. Program memory 704 can be a volatile memory. Another form of computer-readable storage medium storing the same codes would be some type of non-volatile storage such as floppy disks, CD-ROMs, DVD-ROMs, hard disks, flash memory, etc. A carrier wave that carries the code across a network is an example of a transmission medium.

Network device 700 interfaces with physical media via a plurality of linecards 706. Some of linecards 706 may interface to customer edge routers while others may act as interfaces into the packet-switched network. It will be appreciated that linecards 706 may also implement virtual interfaces. The attachment circuits and pseudowires themselves may be hosted on the linecards 706. As packets are received, processed, and forwarded by network device 700, they may be stored in a packet memory 708.

Network device 700 may implement all of the network protocols and extensions thereof described above as well as the data networking features provided by the present invention. Much of the functionality may be left to the linecards 706. It will be understood the linecards 706 may themselves contain processing resources, software, and other resources as referred to in reference to the description of network device 700 as a whole.

It is understood that the examples and embodiments that are described herein are for illustrative purposes only and that various modifications and changes in light thereof will be suggested to persons skilled in the art and are to be included within the spirit and purview of this application and scope of the appended claims and their full scope of equivalents.

The invention claimed is:

1. A method for operating a first provider edge node in a virtual private network, said method comprising:

providing a source forwarder in said first provider edge node wherein a target forwarder is provided at a second provider edge node of said virtual private network;

sending a request from said first provider edge node to said second provider edge node for connection of said source forwarder to said target forwarder via a pseudowire; and including in said request an identifier of said target forwarder, said identifier comprising a portion belonging to an address space shared by forwarders that are connected to multiple attachment circuits to customer nodes and forwarders that are connected to a customer node via exactly one attachment circuit, said identifier being globally unique within said virtual private network;

wherein one of said source forwarder and said target forwarder is associated with a virtual private wire service and the other of said source forwarder and said target forwarder is associated with a virtual private local area network service.

2. The method of claim 1 wherein said source forwarder comprises a virtual switching instance and said target forwarder is connected to a single attachment circuit.

3. The method of claim 1 wherein said source forwarder is connected to a single attachment circuit and said target forwarder comprises a virtual switching instance.

4. The method of claim 1 wherein at least one of said source forwarder and said target forwarder comprises a colored pool.

5. The method of claim 1 wherein said virtual private network comprises a layer 2 virtual private network.

6. The method of claim 1 wherein said identifier further comprises a portion identifying a virtual private network address of said second edge node.

7. The method of claim 6 further comprising:
prior to sending said request, receiving said identifier in a BGP advertisement.

8. The method of claim 7 wherein said BGP advertisement comprises an address family identifier that is common to multiple layer 2 virtual private network applications.

9. A computer-readable storage medium encoded with a computer program for operating a first provider edge node in a virtual private network, said computer program comprising:
code that provides a source forwarder in said first provider edge node wherein a target forwarder is provided at a second provider edge node of said virtual private network;
code that sends a request from said first provider edge node to said second provider edge node for connection of said source forwarder to said target forwarder via a pseudowire;
code that includes in said request an identifier of said target forwarder, said identifier comprising a portion belonging to an address space shared by forwarders that are connected to multiple attachment circuits to customer nodes and forwarders that are connected to a customer node via exactly one attachment circuit, said identifier being globally unique within said virtual private network;
wherein one of said source forwarder and said target forwarder is associated with a virtual private wire service and the other of said source forwarder and said target forwarder is associated with a virtual private local area network service.

10. The computer-readable storage medium of claim 9 wherein said source forwarder comprises a virtual switching instance and said target forwarder is connected to a single attachment circuit.

11. The computer-readable storage medium of claim 9 wherein said source forwarder is connected to a single attachment circuit and said target forwarder comprises a virtual switching instance.

12. The computer-readable storage medium of claim 9 wherein at least one of said source forwarder and said target forwarder comprises a colored pool.

13. The computer-readable storage medium of claim 9 wherein said virtual private network comprises a layer 2 virtual private network.

14. The computer-readable storage medium of claim 9 wherein said identifier further comprises a portion identifying a virtual private network address of said second edge node.

15. The computer-readable storage medium of claim 14 further comprising:
code that, prior to sending said request, receives said identifier in a BGP advertisement.

16. The computer-readable storage medium of claim 15 wherein said BGP advertisement comprises an address family identifier that is common to multiple layer 2 virtual private network applications.

17. An apparatus for operating a first provider edge node in a virtual private network, said apparatus comprising:
a processor that executes instructions; and
a memory device that stores said instructions, said instructions comprising:
code that provides a source forwarder in said first provider edge node wherein a target forwarder is provided at a second provider edge node of said virtual private network;
code that sends a request from said first provider edge node to said second provider edge node for connection of said source forwarder to said target forwarder via a pseudowire;
code that includes in said request an identifier of said target forwarder, said identifier comprising a portion belonging to an address space shared by forwarders that are connected to multiple attachment circuits to customer nodes and forwarders that are connected to a customer node via exactly one attachment circuit, said identifier being globally unique within said virtual private network;
wherein one of said source forwarder and said target forwarded is associated with a virtual private wire service and the other of said source forwarder and said target forwarder is associated with a virtual private local area network service.

18. The apparatus of claim 17 wherein said source forwarder comprises a virtual switching instance and said target forwarder is connected to a single attachment circuit.

19. The apparatus of claim 17 wherein said source forwarder is connected to a single attachment circuit and said target forwarder comprises a virtual switching instance.

20. The apparatus of claim 17 wherein at least one of said source forwarder and said target forwarder comprises a colored pool.

21. The apparatus of claim 17 wherein said virtual private network comprises a layer 2 virtual private network.

22. The apparatus of claim 17 wherein said identifier further comprises a portion identifying a virtual private network address of said second edge node.

23. The apparatus of claim 22 wherein said instructions further comprise:
code that, prior to sending said request, receives said identifier in a BGP advertisement.

24. The apparatus of claim 23 wherein said BGP advertisement comprises an address family identifier that is common to multiple layer 2 virtual private network applications.

25. An apparatus for operating a first provider edge node in a virtual private network said apparatus comprising:
a processor that executes instructions; and
a memory device that stores said instructions, said instructions cormprising:
means for providing a source forwarder in said first provider edge node wherein a target forwarder is provided at a second provider edge node of said virtual private network;

means for sending a request from said first provider edge node to said second provider edge node for connection of said source forwarder to said target forwarder via a pseudowire; and means for including in said request an identifier of said target forwarder, said identifier comprising a portion belonging to an address space shared by forwarders that are connected to multiple attachment circuits to customer nodes and forwarders that are connected to a customer node via exactly one attachment circuit, said identifier being globally unique within said virtual private network;

wherein one of said source forwarder and said target forwarder is associated with a virtual private wire service and the other of said source forwarder and said target forwarder is associated with a virtual private local area network service.

* * * * *

UNITED STATES PATENT AND TRADEMARK OFFICE
CERTIFICATE OF CORRECTION

PATENT NO.        : 7,596,629 B2                                                    Page 1 of 1
APPLICATION NO. : 10/430637
DATED             : September 29, 2009
INVENTOR(S)       : Wei Luo It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1306 days.

Signed and Sealed this

Twenty-eighth Day of September, 2010

David J. Kappos
*Director of the United States Patent and Trademark Office*